United States Patent [19]

Mendenhall

[11] E Re. 30,685

[45] Reissued Jul. 21, 1981

[54] PROCESS FOR RECYCLING ASPHALT-AGGREGATE COMPOSITIONS

[76] Inventor: Robert L. Mendenhall, 1770 Industrial Rd., Las Vegas, Nev. 89102

[21] Appl. No.: 875,397

[22] Filed: Feb. 6, 1978

Related U.S. Patent Documents

Reissue of:

[64] Patent No.: 4,000,000
Issued: Dec. 28, 1976
Appl. No.: 488,518
Filed: Jul. 15, 1974

U.S. Applications:

[63] Continuation-in-part of Ser. No. 286,613, Sep. 5, 1972, abandoned, and Ser. No. 360,464, May 15, 1973, Pat. No. 3,845,941.

[51] Int. Cl.[3] ..... C08J 3/18; C08K 5/01; C08L 95/00

[52] U.S. Cl. ..... 106/280; 106/281 R; 404/72

[58] Field of Search ..... 106/280, 278; 404/79

[56] References Cited

U.S. PATENT DOCUMENTS

| | | | |
|---|---|---|---|
| 938,698 | 11/1909 | Pine | 106/273 R |
| 1,189,772 | 7/1916 | Ammann | 34/134 |
| 1,639,276 | 8/1927 | Schutte | 404/79 |
| 2,034,860 | 3/1936 | Dalin | 34/137 |
| 2,421,345 | 5/1947 | McConnaughay | 259/158 |
| 2,639,651 | 5/1953 | Scott | 106/280 X |
| 2,701,213 | 2/1955 | Neville | 106/278 |
| 2,715,517 | 8/1955 | Bojner | 34/142 |
| 2,884,229 | 4/1959 | Francis et al. | 34/108 |
| 3,423,222 | 1/1969 | McConnaughay | 106/278 |
| 3,567,475 | 3/1971 | Rustler | 106/278 |
| 3,832,201 | 8/1974 | Shearer | 106/281 |
| 3,845,941 | 11/1974 | Mendenhall | 259/157 |
| 4,000,000 | 12/1976 | Mendenhall | 106/280 |

FOREIGN PATENT DOCUMENTS

| | | |
|---|---|---|
| 345946 | 11/1934 | Canada . |
| 670727 | 1/1939 | Fed. Rep. of Germany . |
| 393454 | 6/1933 | United Kingdom . |
| 456922 | 11/1936 | United Kingdom . |

OTHER PUBLICATIONS

The Reclamix Process-A Manual for Engineers and Contractors-2/4/64.

Abraham, "Asphalts and Allied Substances", 6th Ed., vol. 3, D. Van Nostrand Co., Inc., N. Y., 1960, C. 3 p. 190 (TN 853 A35).

Recycling Report, Hot Recycling of Yesterday, vol. 1-No. 2, 9-1977, National Asphalt Pavement Association.

*Primary Examiner*—Theodore Morris
*Attorney, Agent, or Firm*—Seiler & Quirk

[57] ABSTRACT

In recycled asphalt-aggregate compositions prepared by adding a suitable amount of make-up asphalt to pieces of the used composition and heating the mixture in a rotating cylindrical drum by tumbling the composition over heated pipes as it is gradually directed towards an output end of the drum, the improvement comprising adding an amount of petroleum hydrocarbon to achieve a laid down asphalt penetration of between 25 and 300 dmm at 77° F. A further embodiment of the improved process comprises venting a mixture of hydrocarbon gases and moisture vaporized from the hot composition mixture at the output end of the apparatus, condensing the moisture and removing it and returning the hydrocarbon gases to a combustion chamber for providing heat to the apparatus tubes. Still another improvement comprises an apparatus modification wherein a plurality of relatively short pipes are disposed in the forward ends of the heating tubes through a front plate displaced from the forward end wall of the drum with the open pipe ends exposed to the combustion chamber for providing heat to the interior of the heating tubes.

10 Claims, 1 Drawing Figure

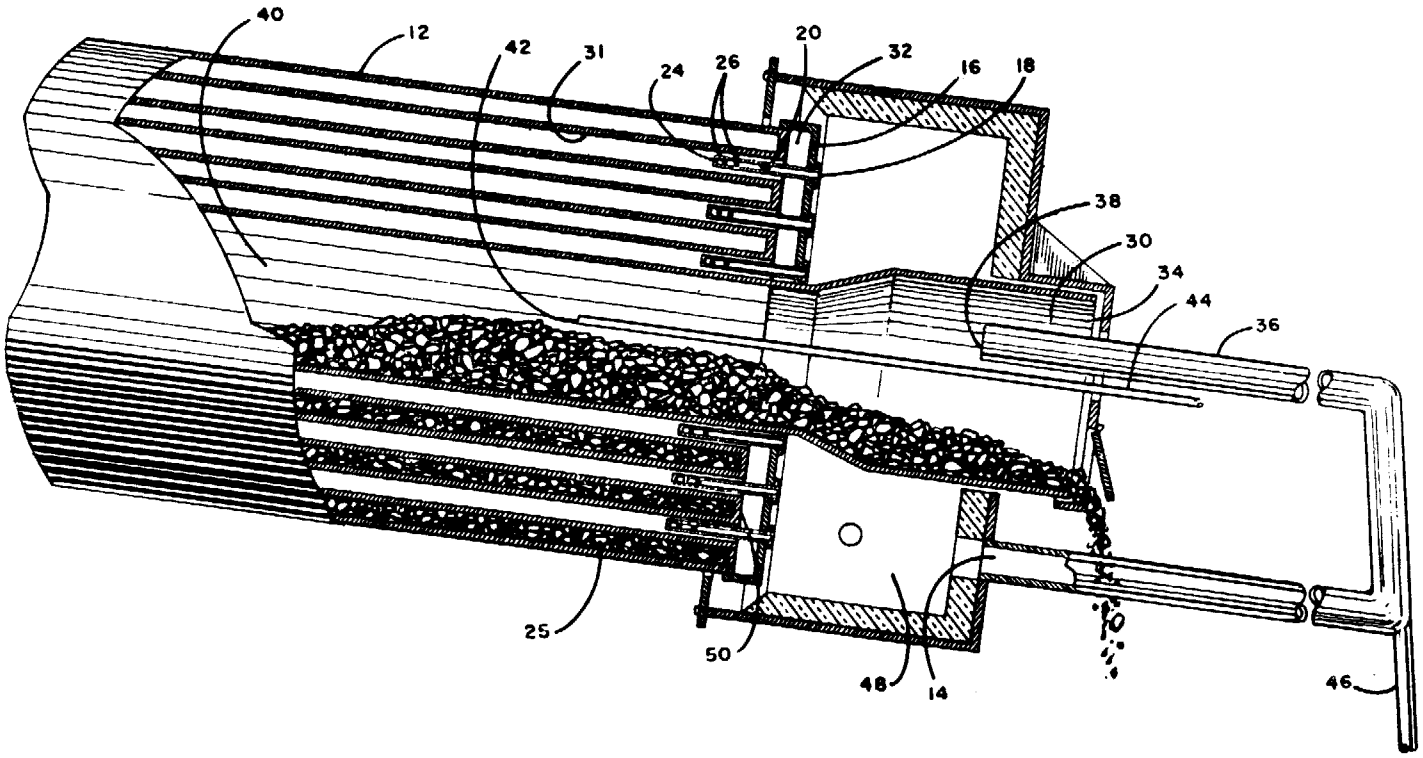
46
36
44
34
30
38
18
16
32
20
26
24
31
42
12
40
14
48
50
25

PROCESS FOR RECYCLING ASPHALT-AGGREGATE COMPOSITIONS

Matter enclosed in heavy brackets [ ] appears in the original patent but forms no part of this reissue specification; matter printed in italics indicates the additions made by reissue.

BACKGROUND OF THE INVENTION

This application is a continuation-in-part of my co-pending applications Ser. No. 286,613, filed Sept. 5, 1972, now abandoned, and Ser. No. 360,464, filed May 15, 1973, now U.S. Pat. No. 3,845,941.

In my aforesaid co-pending applications there are described processes and apparatus for recycling used asphalt-aggregate compositions. That apparatus, of which the present invention constitutes an improvement, includes an elongated cylindrical drum having a plurality of heating tubes extending substantially along the length of the drum interior. Used asphalt-aggregate compositions are recycled by introducing them into an input end of the drum and rotating the drum while heating the tubes so that the composition becomes heated gradually by contact with the heated tube surfaces. The description in my aforesaid applications of the apparatus and method of its use in producing recycled asphalt-aggregate compositions are incorporated herein by reference.

Previous methods of heating asphalt compositions utilizing tumbling action within a cylinder, such as described in U.S. Pat. No. 3,423,222, are inefficient since the materials are directly exposed to flame emitted from a burner. Not only does such exposure to direct flame or hot gases cause burning and deterioration of asphalt, since the only portion of the material being heated is that exposed on the surface of the mass, but the resulting smoke and vapors drawn into the atmosphere are obviously a pollution hazard. In my previous co-pending applications this disadvantage is eliminated by utilizing heating pipes which not only avoids contamination in burning of the asphalt, since there is no exposure to flame, but also greatly increases the heating efficiency since a significant amount of material is in contact with the hot tubes. Moreover, complete mixing of the composition is greatly facilitated, because the pipes act to deflect the material in different directions cascading over the hot tubes as the drum rotates, thereby, improving the compositions' homogeneity.

In my later filed application Ser. No. 360,464, there is disclosed means for venting moisture or water vapor given off during the heating process from the input end of the cylindrical drum where temperatures are coolest. In addition, there is also disclosed means for venting hydrocarbon gases volatilized from the heated asphalt composition at the hot output end and directing the gas into the heating or combustion chamber.

Notwithstanding the above-mentioned improvements in both the apparatus and process techniques, there have remained certain problems which are to be solved according to the present invention. It has been found that, even with the addition of required amounts of make-up asphalt to the recycled material, in many cases, the asphalt present in the used recycled material has lost so much of the light hydrocarbons originally present that penetration and viscosity characteristics of the composition have been greatly affected. Thus, further improvement of the recycled asphalt-aggregate compositions is achieved by adding petroleum hydrocarbons during the heating and mixing process whereby the original viscosity and penetration characteristics are obtained without weakening the material.

Still another problem is in the venting of hydrocarbon gases from the output end of the apparatus where the recycled composition is heated to its highest temperatures in the process. This is especially so where the used material being recycled contains significant amounts of water, even though some water vapor is vented at the relatively cool input end of the apparatus since much of the moisture remains in the material and is carried forward in the process, being vaporized nearer the output end thus using significant amounts of heat in the water vaporization. It is also desirable to remove this water vapor from the hydrocarbon gases vented from the heating cavity and directed to the combustion chamber.

In both of my aforesaid co-pending applications the elongated cylindrical drum, in which the asphalt-aggregate composition is mixed and heated incorporates a heating chamber at the forward or output end of the apparatus. A front end wall of the cylindrical drum forms one wall of heating chamber into which a flame from a gas or other fuel burner is directed. In addition, the heating tubes have open ends extending from this front wall and communicating with the heating chamber so that the tubes and front wall itself become extremely hot. This causes loss of hydrocarbon volatiles and even excessive burning or coking of the asphalt at the output end of the cylindrical drum from contact with extremely hot front wall and tube surfaces adjacent the front wall. It is to the elimination of these disadvantages and problems that the present invention is directed.

SUMMARY OF THE INVENTION

In the present invention the product achieved is significantly improved in penetration characteristics by adding petroleum hydrocarbon, preferably having a major amount, and even more preferable, at least about 55% by weight aromatic hydrocarbons. This petroleum hydrocarbon material is preferably added near the output end of the drum or after the used asphalt-aggregate composition has been heated in a heating and mixing chamber to a temperature of at least about 200° F. followed by further mixing of the product to achieve substantial homogeneity.

The problem of water vapor present in the volatilized hydrocarbon gaseous mixture is obviated by venting the gaseous composition into an elongated conduit in which the water vapor is condensed, drawn off or drained and the hydrocarbon gases are then directed to the heating chamber of the apparatus.

In still another improvement, coking or burning of asphalt at the hot output end of the apparatus is obviated by providing a front plate spaced apart from the forward end wall of the cylindrical drum and which front plate is exposed to the heating chamber. A plurality of relatively short, open-ended pipes of cross-section dimension smaller than the heating tubes are secured to the front plate and communicate with the heating chamber at their forward ends and extend for a distance into the larger heating tubes. In this manner neither the forward wall of the drum nor the heating tubes are exposed directly to the heating chamber thereby significantly reducing burning and deterioration of the asphalt without lowering the efficiency of the apparatus. These improvements will be more specifically described in the following detailed description.

BRIEF DESCRIPTION OF THE DRAWING

The FIGURE is a side view, partially in section, showing the output end of a cylindrical drum modified according to the invention.

RECYCLED ASPHALT-AGGREGATE COMPOSITION

It has been found in many cases that used asphalt-aggregate compositions have become rather brittle or hard. Because of the deterioration of the asphalt in the old composition, where hydrocarbons have been volatilized or otherwise lost through exposure, use and heat, often the recycled composition does not have the penetration characteristics of freshly prepared or virgin asphalt-aggregate compositions.

According to the invention it has been found that by adding a petroleum hydrocarbon to the used composition being recycled, desired penetration and viscosity characteristics are achieved which are substantially the same as virgin asphalt-aggregate compositions. Although diesel oil or gas oil or other similar relatively light petroleum hydrocarbons may be used and which have boiling ranges of, for example, between about 450°-800° F., somewhat less volatile hydrocarbons are preferred. It will be understood where the hydrocarbon is too light or volatile, it may cause too much thinning of the composition which weakens the binder and strength characteristics of the final material. Preferred hydrocarbons are the highly aromatic, low viscosity, low volatility petroleum fractions such as thermally cracked residues, high boiling fractions of catalytically cracked gas oil, boiling fractions of cracking cycle stocks, residues from pyrolysis of residual petroleum fuel oils used in the production of gas and the like, and highly aromatic extracts of distillate oils used in making lube oils. Preferred members of the latter group include the high boiling extracts obtained by use of nonreactive highly polar, aromatically preferential solvents such as liquid sulfur dioxide, phenol, cresylic acid, betadichloroethyl ether, nitrobenzene, etc. The use of the so-called double solvent process employing mutually immiscible solvents like cresylic acid and propane also yields suitable extracts. The useful hydrocarbon fractions may contain paraffinic unsaturated and naphthenic compounds, but are predominantly aromatic, that is, they contain above about 55% and preferably above 65% aromatics by weight. Viscosities of these materials may range from about 35-150 SSU at 210° F. to 75 to more than 13,000 SSU at 100° F. In general, the most preferred petroleum hydrocarbon fractions have a viscosity-gravity constant (VGC) about 0.905 and initial boiling points above about 300° F. and, preferably, above 500° F. Mixtures of these hydrocarbons may also be used. More preferable, initial boiling points of the hydrocarbon compositions are above about 500° F. with flash points (c.o.c.) above about 300° F. Typical of these hydrocarbons are "Dutrex" oils available from Shell Chemical Co.

Addition of the petroleum hydrocarbons to the used asphalt-aggregate materials may be accomplished at any time during the process; for example, just prior to or at the time these used materials are placed in the cylindrical drum. However, the petroleum hydrocarbon is preferably added within the cylindrical drum mixing chamber when the asphalt-aggregate and make-up asphalt composition mixture has been heated to above about 200° F. and is, or approaches a semi-fluid composition. Accordingly, this addition takes place in the forward half of the mixing cavities, i.e., the portion of the cavity toward the hotter output end of the cylindrical mixing drum. This may be readily accomplished by extending a pipe 44 through chute cover 34 as shown in the FIGURE having an open end 42 which may be a spray nozzle or the like within mixing cavity 40. The pipe 44 is connected to a tank or other source containing the petroleum hydrocarbon, and preferably with means provided for metering the proper amounts of hydrocarbon into the mixing cavity at desired times or continuously during the processing. The specific amounts of hydrocarbon to be added, according to the invention, will vary depending on the hardness of the used asphalt-aggregate composition being recycled, and the desired penetration of the final material. The desired penetration of laid down asphalt is usually between the 35 and about 300 dmm (ASTM method D-5), the higher penetration within this range being used in colder weather sufacing and lower penetrations within the range during warm weather. It will also be appreciated that penetration of asphalt will usually decrease after mixing and lay down. For example, the penetration of 85/100 asphalt after mixing and laydown is about 50-60 dmm at 77° F., 60/70 asphalt is about 35-45 dmm, and that of 40/50 asphalt about 25/35 dmm. Variations depend on the type of asphalt and mixing cycles used.

The following example illustrates the improvements of compositions by adding the hydrocarbons.

Samples of used asphalt were mixed with a petroleum hydrocarbon having the following properties:

| | | |
|---|---|---|
| Viscosity, SSU/100° F. | | 13,430 |
| SSU/210° F. | | 99.3 |
| Gravity, °API | | 5.6 |
| Specific Gravity/60° F. | | 1.0320 |
| Flash Point, c.o.c., °F. | | 425 |
| Distillation, °F. | | |
| | IBP | 740 |
| | 5% | 765 |
| | 10% | 772 |
| | 50% | 818 |
| | 90% | 884 |
| Viscosity-Gravity Constant (VGC) | | 0.996 |
| Molecular Analysis, Clay-Gel, percent by wt. | | |
| Asphaltenes | | 0 |
| Polar Compounds | | 18.0 |
| Aromatics | | 76.0 |
| Saturates | | 6.0 |

The hydrocarbon was added to the samples and the mixtures were heated and mixed until thoroughly blended. The amounts of hydrocarbon were percent by weight of the total sample, including asphalt and hydrocarbon. Penetration tests were carried out at 77° F., according to ASTM D-5, on the resulting product.

| COMPOSITON % | |
|---|---|
| ASPHALT | HYDROCARBON |
| 100 | 0 |
| 92 | 8 |
| 85 | 15 |
| 70 | 30 |
| PENETRATION 77° F., dmm | SOFTENING POINT, °F. |
| 23 | 142 |

-continued

| COMPOSITON % | | |
|---|---|---|
| 42 | | 130 |
| 70 | | 120 |
| 201 | | 106 |
| VISCOSITY | | DUCTILITY |
| 140° F., POISES | 275° F., cs | 77° F., cm |
| 11,330 | 560 | 150+ |
| 3,480 | 351 | 150+ |
| 1,240 | 220 | 150+ |
| 224 | 77 | — |

It will be seen from the above example that the addition of the petroleum hydrocarbon to the used asphalt compositions yields a significant increase in penetration, and lowering of the product softening point and viscosity. However, it will be appreciated that different amounts of hydrocarbon may be required for different types of used compositions depending on age and characteristics of the asphalt present in the recycled mixture to achieve the desired penetration and viscosity characteristics. Accordingly, the examples given here are representative only for the purpose of illustration. It will also be understood that blends of various petroleum hydrocarbons, and especially blends of materials having the characteristics set forth herein, may be used in different amounts than those indicated to achieve the desired penetrations and viscosities.

INTERNAL HEATING PIPES

Referring further to the FIGURE, there is illustrated the forward or output end of cylindrical drum 12 which has an improved design for reducing coking or burning and undue loss of hydrocarbons of recycled asphalt-aggregate composition 25 within the mixing cavity 40. Pursuant to the invention, a front plate 16 is exposed to firing chamber 48 and is spaced apart forwardly from end wall 50 of the drum 12. Accordingly, an airspace 32 extends along the forward end of the cylinder, between front wall 50 and front plate 16, which provides insulation to further reduce heating of the front wall, which contacts the asphalt containing composition. Within each of the heating tubes 31 are inserted relatively short pipes 20 open at both ends. The forward end of the pipes 20 are provided with a flange 18 or other similar means for being secured to front plate 16 which then acts as a support for maintaining the pipes in spacial relationship from the interior sides of the heating tubes 31. These pipes may also be provided with orifices 26 near or adjacent to the interior pipe end 24 for further distribution of the heat from heating chamber 48, which is directed into the forward, open end of the pipes exposed to the chamber. The number of such orifices or ports, or their use, is optional.

The length to which the pipes extend into the heating tubes depends on the location which the hot gases are desired to be directed. As a practical matter, a distance of between about 1 and about 3 feet, or more preferable about 2 feet, rearwardly from front plate 16 is desirable. It will be understood that the pipes should not extend too far from the front plate into the heating tubes since the recycled composition is to be gradually heated from the input end reaching its hottest temperatures at the output end.

The distance between the forward end wall and the front plate is not critical, and a matter of a few inches, for example, about 2 to about 6 inches, will be desirable, it being understood that the purpose is to prevent forward wall 50 of the cylindrical mixing drum 12 from becoming unduly hot, which would cause coking and burning of the composition contacting the wall. Moreover, the heating tubes are not directly exposed to the firing chamber since the heat must first be directed through the pipes which are separated or spaced from the interior tube walls. This further reduces the temperature of the heating tubes near front plate 50 and eliminates coking or burning, and volatile hydrocarbon losses from the heated composition. Front plate 16 as well as the pipes should be constructed of materials which will be resistant to the temperatures to which they are exposed in the heating chamber. Stainless steel or similar material is quite useful.

VENTING OF GASES

The FIGURE further shows modification of the apparatus for venting a gaseous mixture of combustible hydrocarbon volatiles and water vapor given off by the heated asphalt-aggregate composition at the output end. As previously explained, although moisture may be removed at the cooler output end of the apparatus, some moisture remains in the gradually heated composition and becomes vaporized as the composition temperature increases toward the output end. It will be understood that moisture in the gradually heated composition will take up greater amounts of heat energy required for vaporization and lower the efficiency of the process in heating the compositions to above about 225° F. Accordingly, a conduit with open end 38 within the drum mixing cavity 40, adjacent to the output end or in chute chamber 30, as shown, is provided. The opposite open end 14 of the conduit communicates with heating chamber 48 for return of the volatile hydrocarbon gases given off by the heated asphalt. The volatilized gases and water vapor from the hot asphalt containing composition are directed into end 38 of conduit 36. These gaseous mixtures are pulled into the conduit and therethrough by a draft or vacuum created in heating chamber 48 as flame from a burner directs heat through the heating tubes. As the gaseous mixture of hydrocarbon volatiles and water vapor drawn into conduit 36 are gradually cooled, the water vapor will be condensed and collect along the interior conduit surface. A drain tube 46, which communicates with conduit 36 provides a means for removing the condensed moisture from the interior passageway, and which moisture is then simply drained through the tube and discarded. The length of conduit 36 is critical only so that it will allow a sufficient cooling of the gaseous mixture containing both the hydrocarbon volatiles, which are to be directed to the heating chamber, and the vaporized moisture, and to allow the latter to condense so that it is separated within the interior passageway. A gate, one-way flutter valve or equivalent means along tube 46, which will allow the condensed vapor to pass from the drain tube without drawing air therethrough, so as not to significantly reduce the draft within the conduit, will also be of use. Moreover, the location of conduit end 38 within chute chamber 30, which is merely an extension of mixing cavity 40, or within the mixing cavity itself, is critical only in that it be positioned for adequate venting of the gaseous mixture to achieve its desired function. Various modifications of the design of the apparatus to achieve the intended purpose, within the purview of the invention, will be understood by those skilled in the art as will other eqivalent modifications of the apparatus descried herein.

I claim

1. In a process for recycling used asphalt-aggregate composition comprising heating and mixing said composition in a heating and mixing chamber, the improvement comprising adding to said composition an amount of petroleum hydrocarbon having at least 55% aromatics, *and heating and mixing the composition at a temperature of at least about 200° F.* to achieve a product having a penetration of between about 25 and about 300 dmm at 77° F.

2. The process of claim 1 wherein said composition is heated to at least about 200° F. prior to adding said hydrocarbon, and mixing said composition and said hydrocarbon in said chamber to produce said product.

3. The process of claim 2 wherein said hydrocarbon has a flash point above about 300° F.

4. The process of claim 3 wherein said hydrocarbon has an initial boiling point above about 500° F.

5. A process for recycling used asphalt-aggregate composition comprising introducing said composition in a heating and mixing chamber, detecting the asphalt deficiency of the composition, adding an amount of make-up asphalt to said composition in response to the detected deficiency, gradually heating and mixing said composition and make-up asphalt in said chamber, and adding an amount of petroleum hydrocarbon having at least 55% aromatics to the mixture in the mixing chamber, *and heating and mixing the composition at a temperature of at least about 200° F.* to achieve a product having a penetration of between about 25 and about 300 dmm at 77° F.

6. The process of claim 5 wherein said hydrocarbon has a flash point above about 300° F.

7. The process of claim 6 wherein said hydrocarbon has an initial boiling point above about 500° F.

8. The process of claim 5 wherein said hydrocarbon is added to said mixture after it has been heated to above about 200° F.

9. The process of claim 1 wherein the asphalt of the product achieved has a ductility of at least 150 cm at 77° F.

10. The process of claim 5 wherein the asphalt of the product achieved has a ductility of at least 150 cm at 77° F.

* * * * *